Patented Nov. 23, 1948

2,454,610

UNITED STATES PATENT OFFICE 2,454,610

METHOD FOR METALIZATION ON NONCONDUCTORS

Harold Narcus, Worcester, Mass.

No Drawing. Application August 13, 1946, Serial No. 690,333

5 Claims. (Cl. 117—47)

This invention relates to processes for metalizing non-conductive materials, such as glass, ceramics, wood, leather, hard rubber, synthetic and natural resins, such as the phenol condensation products or materials coated therewith; and the principal object of the invention is to provide a convenient, dependable and inexpensive process for the above purpose.

Another object of the invention is to provide a process for treating the above named non-conductive materials so that an adherent metal coating may be applied thereto.

Another object is to provide a novel and improved process for applying to the surfaces of the above materials a conductive layer capable of receiving subsequent electrodeposition.

Various other objects and advantages will be apparent as the nature of the invention is more fully disclosed.

The present process comprises in general treating the surface of a non-conductive material, not capable of being electroplated in the usual manner, with an adherent metalized layer, said layer being suitable for subsequent electroplating.

Available processes for performing the metalization of non-conductive materials have utilized a metallic silver coating in order to produce suitable conductivity for subsequent electrodeposition. This silver coating has proven objectionable because of the relatively high cost of silver which results in an increase in the ultimate cost of the plated article. Furthermore, using silver films, the metalized layer has not proven to be as firmly adherent to the non-conductive material as would be desired. A further objection is that some degree of sludge (silver oxide) forms with deposition of silver films which results in rough electrodeposits. Furthermore, using silvering solutions, a resulting mixture, explosive in nature, occurs. Using the process herein described, employing copper films, said objections are eliminated.

The non-conducting substance is cleaned thoroughly using mild proprietary cleaners which will not severely attack the substance. After thorough cleaning it is then treated in an "activating" solution to prepare the surface for the subsequent conductive copper film prior to electrodeposition. The term "activating" applies to the treatment which produces a nuclei of reductive ions in the pores of the substance accelerating the formation of the metal coating and its subsequent good adhesion to the inert substance.

After thoroughly rinsing the article in clean running water, the article is then immersed in a "seeding" solution. The term "seeding" applies to the treatment which acts in the nature of a catalyst to the actual formation of the conductive film on the surface of the non-conductive substance.

As an example of one method for carrying out this process, the material, such as cellulose acetate or any other synthetic resin of the thermo-plastic or thermo-setting type, is first cleansed in a mild proprietary cleaner containing sodium hydroxide in removing all foreign substance, and thoroughly rinsed. The part is then immersed in a 10% nitric acid solution for one minute. This treatment is followed by a thorough rinse. The material thus cleansed is placed in a so-termed "activating" solution for a period of 3 to 5 minutes. This solution may have the following composition:

Titanium oxide; 5 to 10 grams
C. P. sulphuric acid 40 to 50 cc. (sp. gr. 1.84)
Sodium lauryl sulphate .1 per cent by weight (wetting agent)
Water, 4,000 cc.

After the surface has been so "activated" as described above, the "activating" solution is thoroughly rinsed away in clean running water and the surface subjected to treatment for 3 to 5 minutes in the so-termed "seeding" solution which may have the following composition:

| | | |
|---|---|---|
| Palladium chloride | gram | ½ to 1 |
| C. P. hydrochloric acid | cc | 10 to 15 |
| Water | cc | 4,000 |

The article is then transferred directly to a solution which is made up by mixing equal amounts of the following component solutions which will form an adherent, continuous, conductive layer of copper on the properly treated inert substance:

Solution A

| | | |
|---|---|---|
| Copper fluoborate (45%) | grams | 100 to 125 |
| Nickel fluoborate (40%) | do | 40 to 50 |
| Alpha-trioxymethylene | do | 75 to 80 |
| Water | cc | 4,000 |

Solution B

| | | |
|---|---|---|
| Sodium hydroxide | grams | 40 to 50 |
| Rochelle salts | do | 150 to 175 |
| Sodium carbonate | do | 15 to 20 |

Treatment in the above coppering mixture will require approximately 30 to 40 minutes for the formation of a continuous adherent copper film on the inert substance. Formation of the initial copper film begins after a period of 5 minutes.

Repeated coatings of copper may be applied using fresh coppering mixtures.

Following the formation of the copper film on the inert substance the part is treated in a 10% ammonium chloride solution, rinsed in water and subjected to the conventional electroplating methods.

It is to be understood that other activating or sensitizing solutions may be used and the invention does not depend on the use of the exact formula of titanium oxide, sulphuric acid, and sodium lauryl sulphate. The activating step for producing the reductive ions may be accomplished by any method or means which will produce the same effect.

The seeding solution may also take different forms but it has been found that it is preferable for the chloride salt to be one of a group of metals below hydrogen in the electromotive series, examples of which are copper, gold, platinum, palladium, etc.

Furthermore, the solution A above identified requires a salt of copper, this metal being the one which is to form the film; together with a similar salt of a metal which has a position above hydrogen in the electromotive series, examples of which are cobalt, nickel, zinc, iron, etc. In addition, this solution contains any reducing agent for copper which is to form the film. Reducing agents which may be used instead of alpha-trioxymethylene are formaldehydes or polymers thereof. Solution B is merely a carrying solution and may take many forms.

The solutions above identified have been found to accomplish the results desired extremely well, but, of course it will be clear to one skilled in the art that variations may also be used to form conductive copper films.

Having thus described my invention and the advantages thereof, I do not wish to be limited to the details herein disclosed, otherwise than is set forth in the claims, but what I claim is:

1. Method of applying a conductive copper film to the surface of an electricity non-conducting article comprising cleaning the surface of the article, immersing the article in an acidic solution containing titanium oxide, rinsing, immersing the article in a solution containing palladium chloride and an acid, and then directly transferring the object to a solution containing copper fluoborate, nickel fluoborate, a reducing agent for copper, and a carrying solution therefor.

2. Method of claim 1 wherein the copper fluoborate is in excess of the amount of nickel fluoborate.

3. Method of applying a conductive film to the surface of an electricity non-conducting object comprising cleaning the surface of the article, immersing the article in a solution of approximately the following composition: Titanium oxide, 5 to 10 grams; sulphuric acid, 40 to 50 cc.; and a wetting agent, .1% by weight, and water in the amount of 4,000 cc.; then rinsing the article and immersing in a solution containing approximately the following composition: palladium chloride, ½ to 1 gram; hydrochloric acid, 10 to 15 cc.; water, 4,000 cc.; then directly transferring the article to a solution made up by mixing substantially equal amounts of the two following solutions: Copper fluoborate (45%) 125 grams, nickel fluoborate (40%) 40 to 50 grams, reducing agent for copper 75 to 80 grams, water 4,000 cc.; and sodium hydroxide 40 to 50 grams, rochelle salts 150 to 175 grams, and sodium carbonate 15 to 20 grams.

4. Method af applying a conductive copper film to the surface of an electricity non-conducting article comprising activating the surface to produce nuclei of reductive ions in the pores thereof by application of an acidic solution containing titanium oxide, immersing the article in a solution containing an aqueous acidic chloride salt solution of a metal selected from a group consisting of copper, gold, palladium and platinum and then directly immersing in a solution containing copper fluoborate and a fluoborate solution of a metal selected from a group consisting of cobalt, nickel, zinc and iron, the last named solution also containing a copper reducing agent.

5. Method of applying a conductive copper film to the surface of an electricity non-conducting article comprising cleaning the surface of the article, immersing the article in an acidic solution containing titanium oxide, rinsing, immersing the object in a solution containing an acid and a chlorine salt of a metal below hydrogen in the electromotive series selected from a group consisting of copper, gold, platinum and palladium and then directly transferring the article to a solution containing fluoborates of copper and of a metal which is above hydrogen in the electromotive series selected from a group consisting of cobalt, nickel, zinc and iron, the last solution being copper reductive.

HAROLD NARCUS.

REFERENCES CITED

The following references are of record in the file of this patent:

UNITED STATES PATENTS

| Number | Name | Date |
|---|---|---|
| 2,214,646 | Walker | Sept. 10, 1940 |
| 2,278,722 | Loiseleur | April 7, 1942 |
| 2,355,933 | Weiss | Aug. 15, 1944 |